(12) United States Patent
Martin

(10) Patent No.: US 12,541,805 B2
(45) Date of Patent: Feb. 3, 2026

(54) SMART BUILDING DATA CONNECTOR

(71) Applicant: Siemens Industry, Inc., Alpharetta, GA (US)

(72) Inventor: Nellie Martin, Libertyville, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 518 days.

(21) Appl. No.: 18/048,639

(22) Filed: Oct. 21, 2022

(65) Prior Publication Data

US 2024/0135470 A1 Apr. 25, 2024
US 2024/0233050 A9 Jul. 11, 2024

(51) Int. Cl.
*G06Q 50/10* (2012.01)
*G06F 16/25* (2019.01)

(52) U.S. Cl.
CPC ............. *G06Q 50/10* (2013.01); *G06F 16/25* (2019.01)

(58) Field of Classification Search
CPC ..... G06Q 50/10; G06F 16/25; H04L 12/2834; H04L 12/2825
See application file for complete search history.

(56) References Cited

U.S. PATENT DOCUMENTS

| | | | |
|---|---|---|---|
| 6,874,034 B1 * | 3/2005 | Hertling | G06F 3/1288 709/201 |
| 2017/0099353 A1 | 4/2017 | Arora et al. | |
| 2018/0234489 A1 | 8/2018 | Hammons et al. | |
| 2020/0367056 A1 * | 11/2020 | Hodge | H04W 12/009 |
| 2021/0158975 A1 | 5/2021 | Turney et al. | |

* cited by examiner

*Primary Examiner* — Charles R Kasenge

(57) ABSTRACT

There is described a smart building data connector, and method thereof, of a building management system. A payload of a local data device is identified for transmission to a remote cloud device. The connector determines whether a remote cloud device is ready to receive the payload. The payload is transmitted to the remote cloud device in response to determining that the remote cloud device is ready to receive the payload. The connector determines whether the payload has been transmitted properly to the remote cloud device in response to transmitting the payload to the remote cloud device. The payload is buffered in response to determining that the remote cloud device is not ready to receive the payload or the payload has not been transmitted properly to the remote cloud device.

12 Claims, 11 Drawing Sheets

SMART BUILDING DATA CONNECTOR

RELATED APPLICATION

This application relates to U.S. patent application Ser. No. 18/048,619, titled SMART BUILDING DATA CONNECTOR, filed Oct. 21, 2022, the content of which is hereby incorporated by reference to the extent permitted by law.

FIELD OF THE INVENTION

This application relates to the field of building management systems and, more particularly, to data connectors between local building devices and remote cloud devices of a building management system.

BACKGROUND

Building management systems encompass a wide variety of systems that aid in the monitoring and control of various aspects of building operation. Building management systems include security systems, fire safety systems, lighting systems, and heating, ventilation, and air conditioning ("HVAC") systems. Systems typically have one or more centralized control stations in which data may be monitored, and in which various aspects of operations may be controlled and/or monitored. Each control station typically includes a computer or server having processing equipment, data storage equipment, and a user interface.

Cloud based solutions for managing building data are highly valued. Building data is more of a commodity now than it has ever been, and customer want to own and user their data in a valuable way, such as driving efficiencies. Data connectors provide a communication link between a data source and a cloud data warehouse. Existing building management systems provide data connectors that are device specific having rigid requirements and, thus, are quite complex to operate.

SUMMARY

In accordance with one embodiment of the disclosure, there is provided a data management approach for building management systems. The approach enables connectivity between local data management devices and remote cloud devices. Using a flexible user interface and intelligent processing, facility data may be configured, selected, and mapped to the cloud devices. An example of the facility is a change of value ("COV") data of the data management device.

One aspect is a smart building data connector of a building management system comprising an outbound data service and a buffer service. The outbound data service identifies a payload of a local data device for transmission to a remote cloud device and determines whether a remote cloud device is ready to receive the payload. The outbound data service also transmits the payload to the remote cloud device in response to determining that the remote cloud device is ready to receive the payload and determines whether the payload has been transmitted properly to the remote cloud device in response to transmitting the payload to the remote cloud device. The buffer service buffers the payload in response to determining that the remote cloud device is not ready to receive the payload or the payload has not been transmitted properly to the remote cloud device.

Another aspect is a method of a smart building data connector of a building management system. A payload of a local data device is identified for transmission to a remote cloud device. Whether a remote cloud device is ready to receive the payload is determined. The payload is transmitted to the remote cloud device in response to determining that the remote cloud device is ready to receive the payload. Whether the payload has been transmitted properly to the remote cloud device is determined in response to transmitting the payload to the remote cloud device. The payload is buffered in response to determining that the remote cloud device is not ready to receive the payload or the payload has not been transmitted properly to the remote cloud device.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
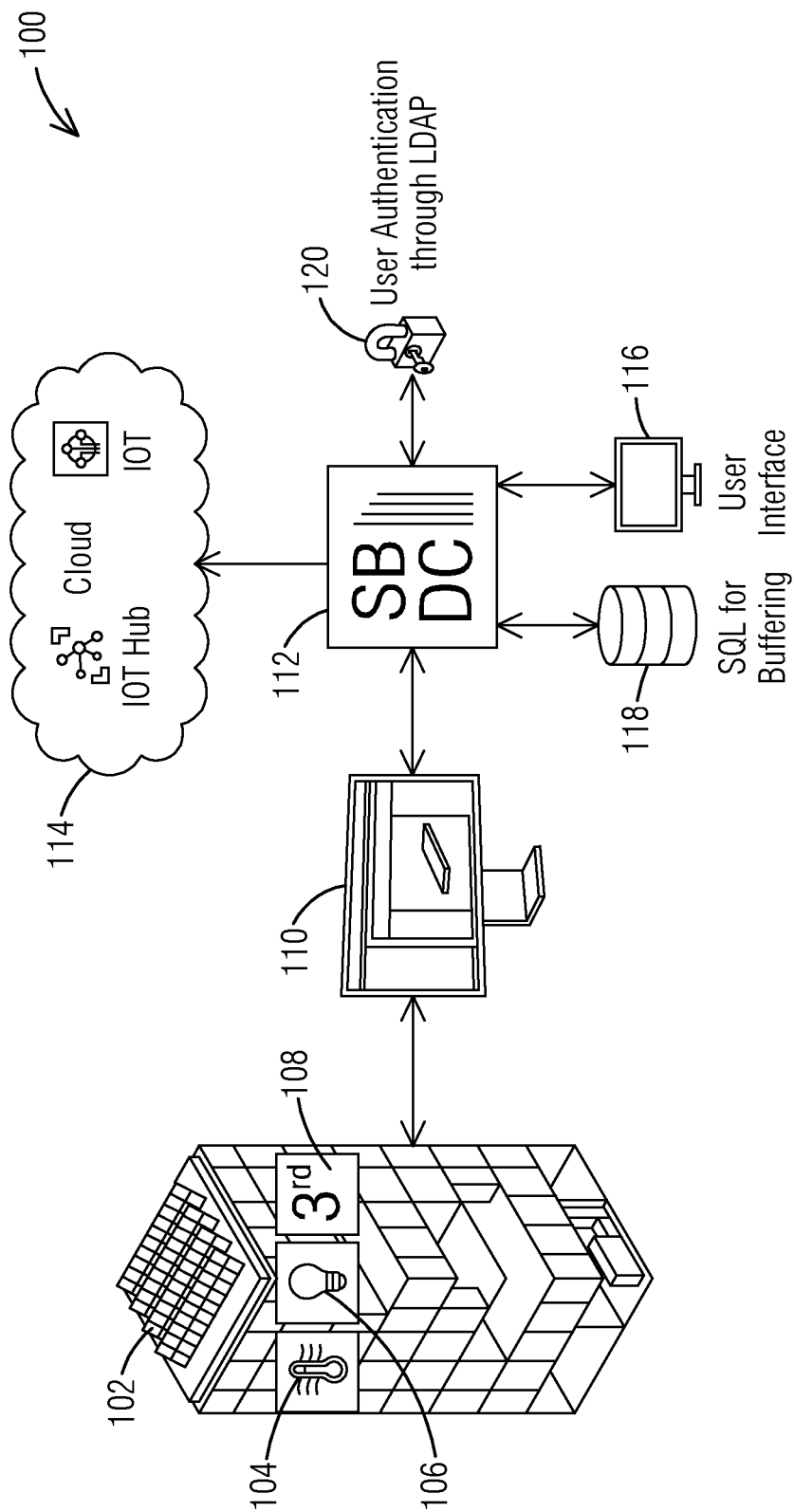
FIG. 1 is an illustration of a building management system in an example implementation that is operable to employ techniques described herein.

Various technologies that pertain to systems and methods that facilitate data monitoring and management will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

A Smart Building Data Connector ("SBDC") enables connectivity between a site and a preferred cloud provider. The SBDC includes a flexible user interface to configure, select, and map data needs to the cloud service, and send change of value ("COV") data to the preferred cloud provider. Examples of data objects includes, but are not limited to, BACnet objects such as BACnet IP, BACnet MSTP, and third-party BACnet devices.

The SBDC is customizable, flexible, and extensible. Using the SBDC interface, filters, connectors, and endpoints may be configured to send specified data from a source to an endpoint. The SBDC may rely on existing infrastructure for managing users and points. Specifically, an Active Directory may manage SBDC user accounts and points may be defined based on existing infrastructure. For some embodiments, the SBDC may subscribe to push notifications for COV data from the user specified views. When a COV occurs, the SBDC may receive, process, and send the relevant data to the defined endpoint.

The SBDC may be used for cloud analytics. A data-driven customer who is doing their own cloud analytics for other systems may add the data of an Integrated Building Management System ("IBMS") to an existing analytic platform. The data may be used for its desired purpose, such as viewing a portfolio of facilities, creating trends, and evaluating needs.

The SBDC may be used for cloud connectivity. An advanced customer may add real time data to a cloud platform. The data may be used to support actionable outcomes, such as creating working work orders with a work order system.

FIG. 1 is an illustration of a building management system 100 in an example implementation that is operable to employ techniques described herein. The building management system 100 includes a building 102, field devices 104-108 to monitor and/or control functions of the building, one or more local data devices 110 located at or in proximity to the building, and a smart building data connector ("SBDC") 112 providing a data connection between the local data devices and one or more remote cloud devices 114. The SBDC includes one or more user interfaces 116 to provide interaction with a user as well as one or more databases 118 to support the buffering operation of the SBDC as described below. It is to be understood that the SBDC 112 may be co-located with a particular local data device 110 or communicating with one or more local data devices. Likewise, the user interface 116 and/or the database or databases may be co-located or otherwise communicate with the SBDC 112. The SBDC 112 may also have a communication link to a user authentication service 120 for security purposes.

The SBDC 112 may rely on an Active Directory to authenticate users for multiple levels of user access, such as an administrative user and a read-only user. For example, administrative access users may configure and control SBDC 112 whereas read-only access users may only view a status page. These active directory groups may be configured as a prerequisite for the installation of SBDC 112. Any user who should be able to access SBDC 112 to view its status as read-only may be added to the read-only access user group. Any user who should be able to configure SBDC 112 may be added to the administrative user group.

The SBDC 112 may use one or more status points of the building management system. In particular, the SBDC 112 may receive status points from the local data device 110 to supply information of operational parameters of SBDC. Examples of status points include, but are not limited to, license, server heartbeat, server message, and server status.

Figure 2:
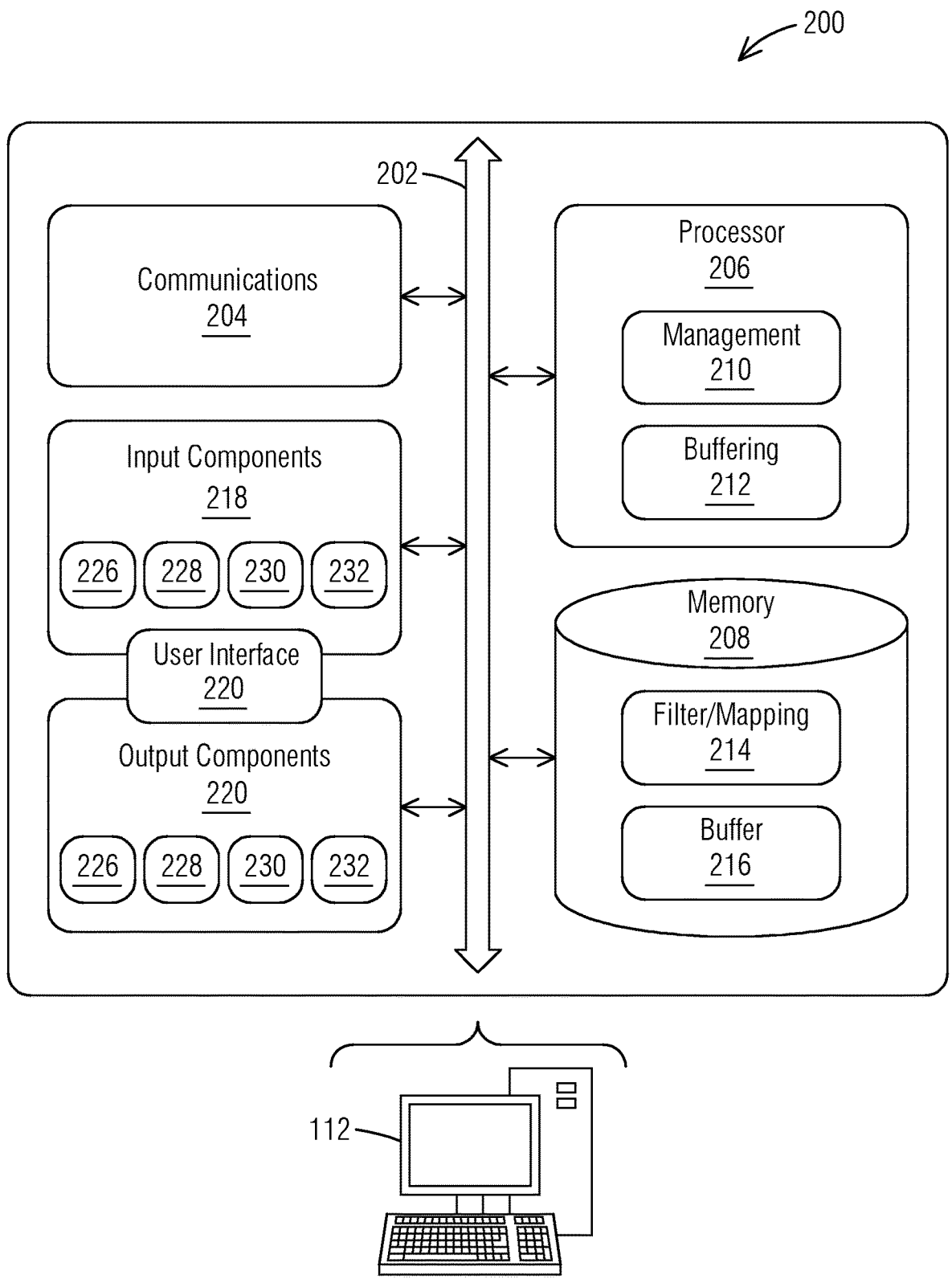
FIG. 2 is a block diagram representing the smart building data connector ("SBDC") of FIG. 1 in an example implementation.

Referring to FIG. 2, there is shown a block management device 140 diagram representing the smart building data connector ("SBDC") 112 in an example implementation. FIG. 2 represents example device components 200 of the SBDC 112. The device components 200 comprise a communication bus 202 for interconnecting other device components directly or indirectly. The other device components include one or more communication components 204 communicating with other entities via a wired or wireless network, one or more processors 206, and one or more memory components 208. The communication component 204 communicates (i.e., receives and/or transmits) data associated with one or more devices of the system 100. The communication component 204 may utilize wired or wireless technology for communication.

The processor or processors 206 may execute code and process data received from other components of the device components 200, such as information received at the communication component 204 or stored at the memory component 208. The code associated with the SBDC 112 and stored by the memory component 208 may include, but is not limited to, operating systems, applications, modules, drivers, and the like. An operating system includes executable code that controls basic functions, such as interactions among the various components of the device components 200, communication with external devices via the communication component 204, and storage and retrieval of code and data to and from the memory component 208.

Each application includes executable code to provide specific functionality for the processor 206 and/or remaining components of the SBDC 112. Examples of applications executable by the processor 206 include, but are not limited to, a management module 210 and a buffering module 212. The management module 210 manages the processing and transfer of payloads from the local data device to the remote cloud device. The buffering module 212 processes a payload in response to determining that the payload is not ready for transmission to the cloud provider or the payload has not been transmitted properly to the cloud provider.

Data stored at the memory component 208 is information that may be referenced and/or manipulated by an operating system or application for performing functions of the SBDC 112. Examples of data associated with the SBDC 112 and stored by the memory component 208 may include, but are not limited to, filter and mapping data 214 and buffer data 216. The filter and mapping data 214 may include filtering information for processing payloads transferred to the remote cloud device and mapping information correlating data between local data device and the remote cloud device. The buffer data 216 stores a payload in response to determining that the payload is not ready for transmission to the cloud provider or the payload has not been transmitted properly to the cloud provider.

The device components 200 may include one or more input components 218 and one or more output components 220. The input components 218 and output components 220 of the device components 200 may include one or more visual, audio, mechanical, and/or other components. For some embodiments, the input and output components 218, 220 may include a user interface 222, such as user interface 116, for interaction with a user of the device. The user interface 222 may include a combination of hardware and software to provide a user with a desired user experience.

It is to be understood that FIG. 2 is provided for illustrative purposes only to represent examples of the SBDC 112 and is not intended to be a complete diagram of the various components that may be utilized by the system 100. Therefore, the SBDC 112 may include various other components not shown in FIG. 2, may include a combination of two or more components, or a division of a particular component into two or more separate components, and still be within the scope of the present invention.

SBDC Management

Referring to FIGS. 3A, 3B, 4-7, 8A, 8B, and 8C, there are shown screen views of the SBDC 112 in example implementations. For creation of a connector of an SBDC, the connector type, filter, mapping and endpoints are defined. In response to creating the real time value connector, the SBDC receives data from the local data device 110, processes the data, and transmits processed data to the remote cloud device 114.

Figure 3A:
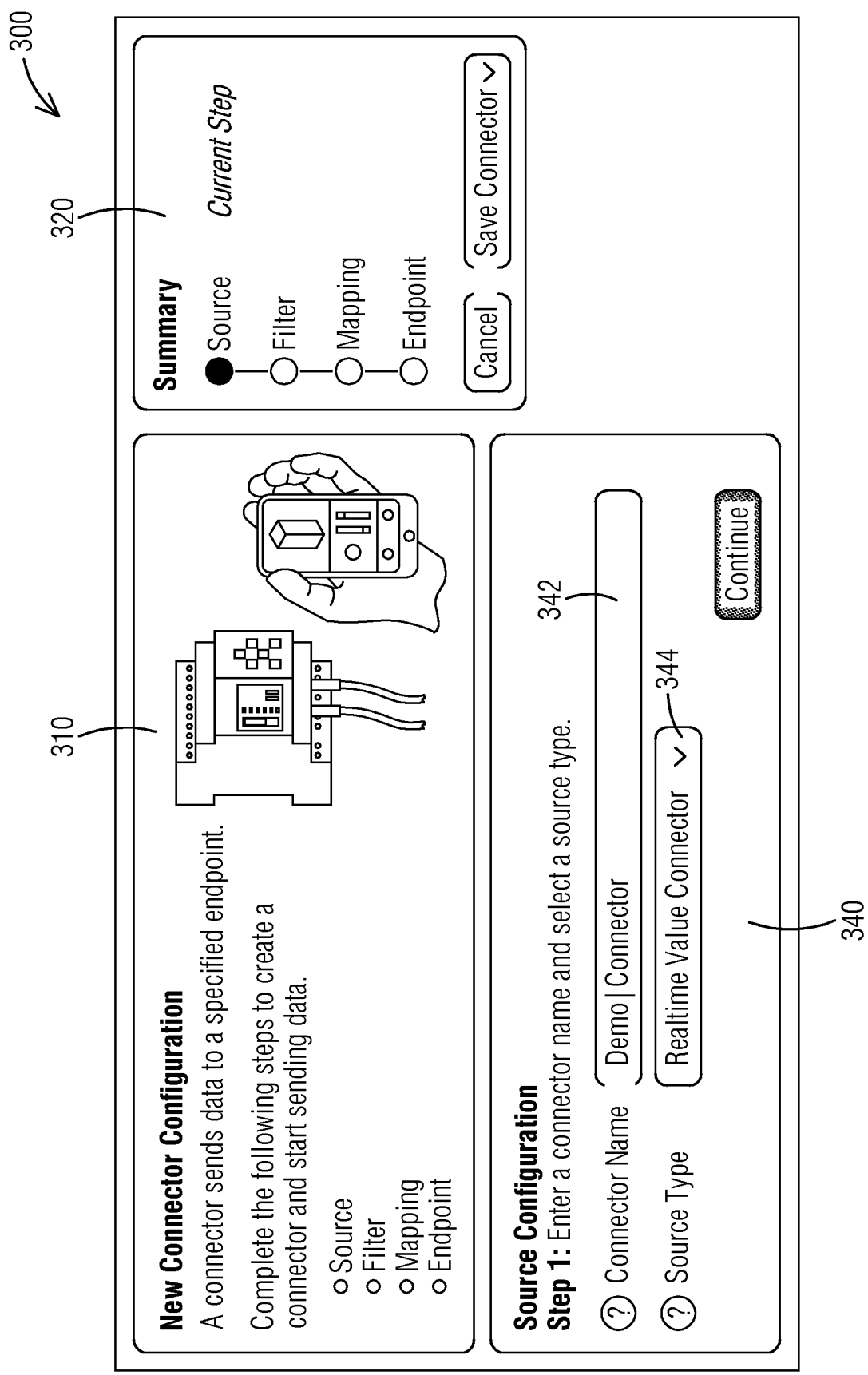
FIGS. 3A, 3B, 4-7, 8A, 8B, and 8C are screen views of the SBDC of FIGS. 1 and 2 in example implementations.

Referring specifically to FIG. 3A, the SBDC process initiates configuration of a connector by configuring the source, as represented by a source configuration data page 300. The example implementation of the source configuration data page 300 shown in FIG. 3A includes a header 310, a summary window 320, and a source configuration window 340. The source configuration data page 300 includes the source configuration window 340 and may optionally include the header 310 and/or the summary window 320. The header 310 may include general information about the source configuration data page 300, such as instructions for a connector configuration. The summary window 320 may include steps for configuring a connector and identify the current step of these steps for configuring. The source configuration window 340 includes a connector name field 342 and a source type field 344. The connector name serves at an identification for the connector. The source type identifies the connector type for the source device, such as real-time value connector. Once the connector name in the connector name field 342 and the source type in the source type field 344 are established, configuration of the new connector continues to the next step upon a user selection or automatic advancement by the system.

Figure 3B:
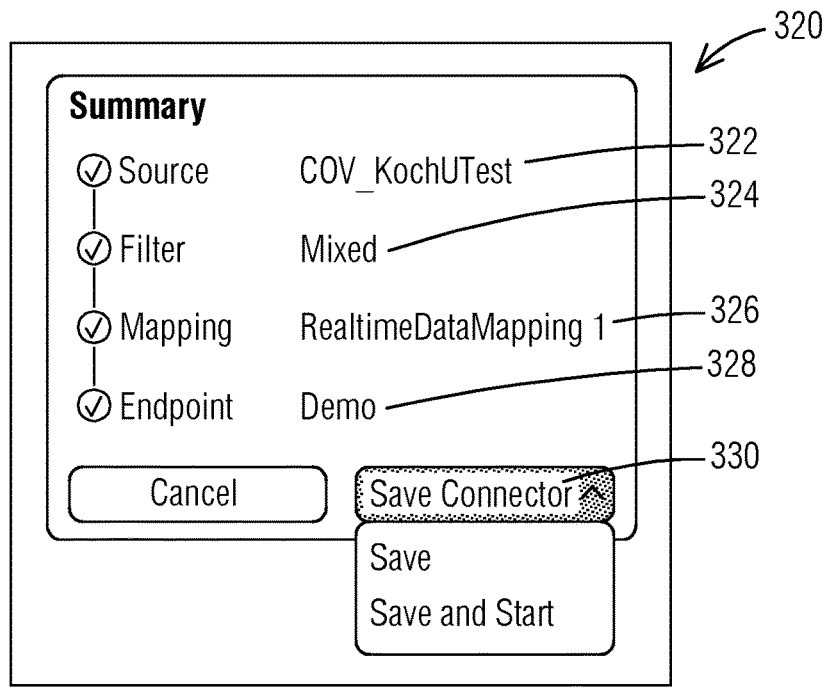

Referring to FIG. 3B, the summary window 320 identifies the steps for configuring the connector. Configuring the connector includes source configuration 322, filter configuration 324, mapping configuration 326, and endpoint configuration 328. Check marks next to each step indicates completion of the corresponding step. Upon completion of all configuring steps, the connector may be saved 330 with or without starting its operation.

Figure 4:
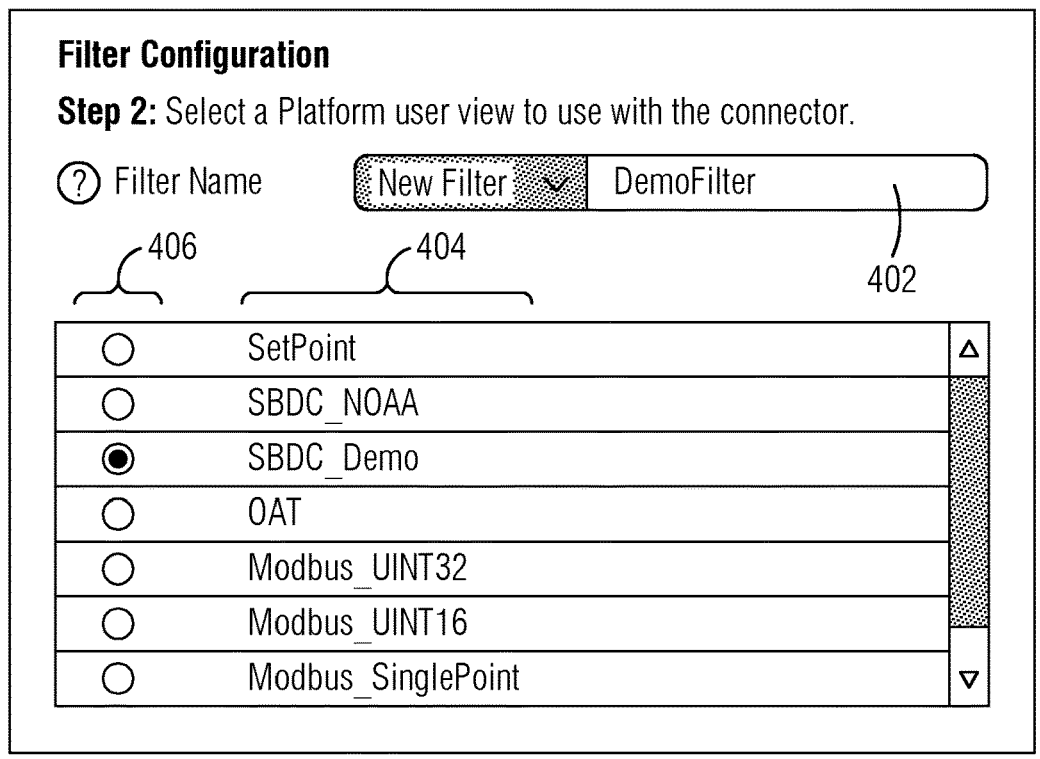

Referring to FIG. 4, the SBDC process configures a filter of the connector as represented by the filter configuration window 400, in response to, or otherwise subsequent to, configuring the source. The filter configuration window 400 includes a new filter name field 402, a list of one or more existing filters 404, and a filter selection corresponding to each existing filter 406. The SBDC 112 assigns a filter to the connector by either generating a new filter name or selecting an existing filter. The filter is determined based on the data format and/or properties of the source data of the local data device and/or the destination data of the remote cloud device. The SBDC 112 may assign the filter automatically or in response to an input at a user interface.

Figure 5:
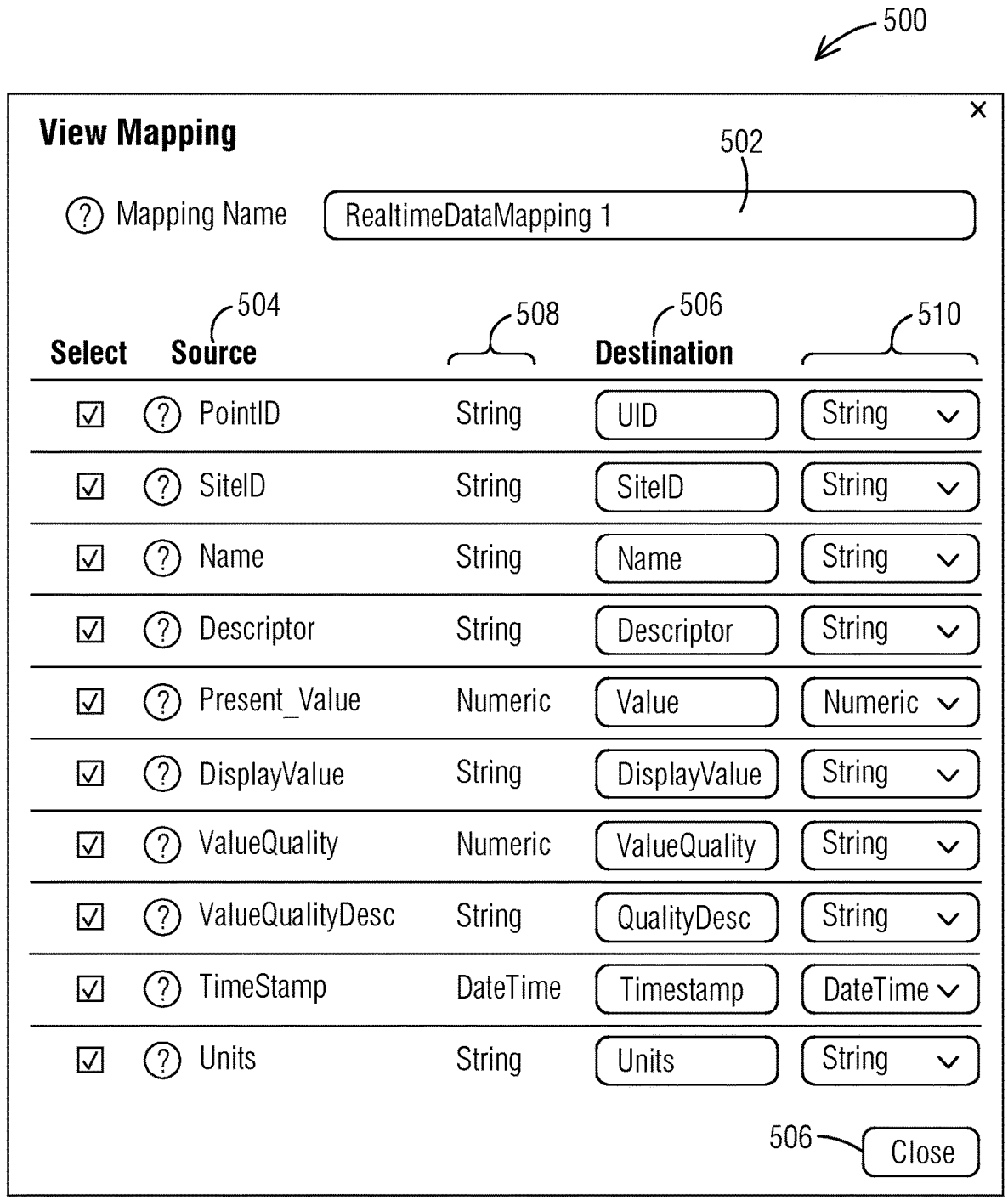

Referring to FIG. 5, the SBDC process configures a mapping of the connector as represented by the mapping configuration window 500, in response to, or otherwise subsequent to, configuring the filter. The mapping configuration window 500 includes a new mapping name field 502, a list of one or more source points 504, and destination point fields 506 corresponding to the source points. Each source point 504 has a corresponding source point type 508, and each destination point 506 has a corresponding destination point type 510. Examples of source point types and destination point types include, but are not limited to, string, numeric, and date/time. The SBDC 112 assigns destination points 506, and for some embodiments, destination point types 510, for mapping the communicated data for the points in the filter selected in the previous step. The SBDC 112 may assign the mapping automatically or in response to an input at a user interface.

Figure 6:
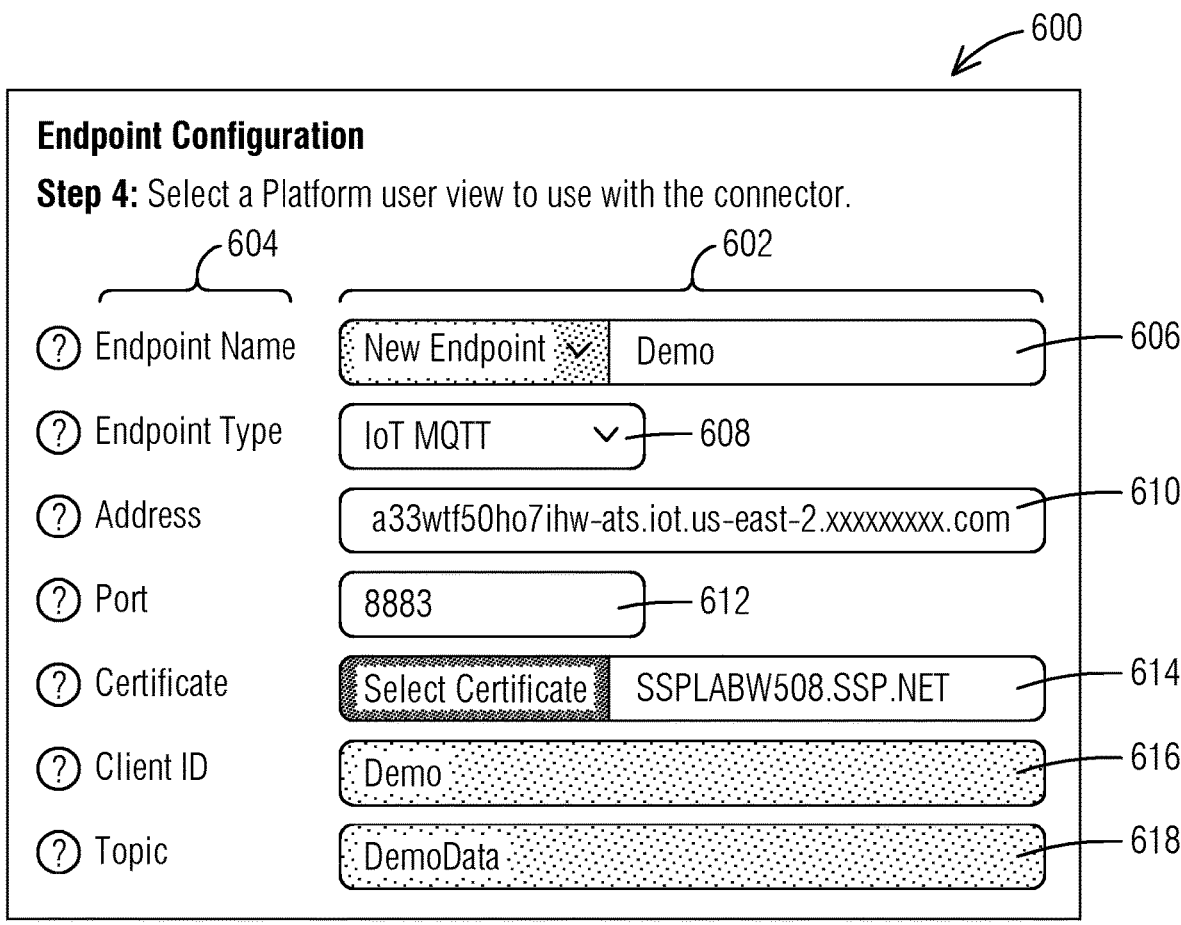

Referring to FIG. 6, the SBDC process configures the endpoint of the connector as represented by the endpoint configuration window 600, in response to, or otherwise subsequent to, configuring the mapping. The endpoint configuration window 600 includes a list of one or more endpoint fields 602 and endpoint field identifiers 604 corresponding to endpoint field. The endpoint fields 602 include an endpoint name field 606, an endpoint type field 608, an address field 610, a port field 612, a certificate selection field 614, a client identification field 616, and a topic field 618. The endpoint name field 606 serves as an identifier for the endpoint of the connector. The endpoint name field 614 may be entered or select from a list of existing endpoints. The endpoint type field 608 corresponds to the type of endpoint for the remote cloud device. Examples of an endpoint type includes, but is not limited to, AWS IoT MQTT and Microsoft Azure IoT Hub MQTT. The address field 610 is an address string associated with the endpoint of the connector.

For some embodiments, the port field 612, the certificate selection field 614, the client identification field 616, and the topic field 618 may be needed for certain remote cloud devices. The SBDC configures the port field 612 and the certificate selection field 614 to correspond to the SBDC endpoint for those embodiments. The client identification field 616 and the topic field 618 may be determined to identify the data for the SBDC endpoint. For example, the remote cloud device name may be used as the client identification and a string describing the type of data may be used as the topic. The SBDC 112 may assign the mapping automatically or in response to an input at a user interface.

Figure 7:
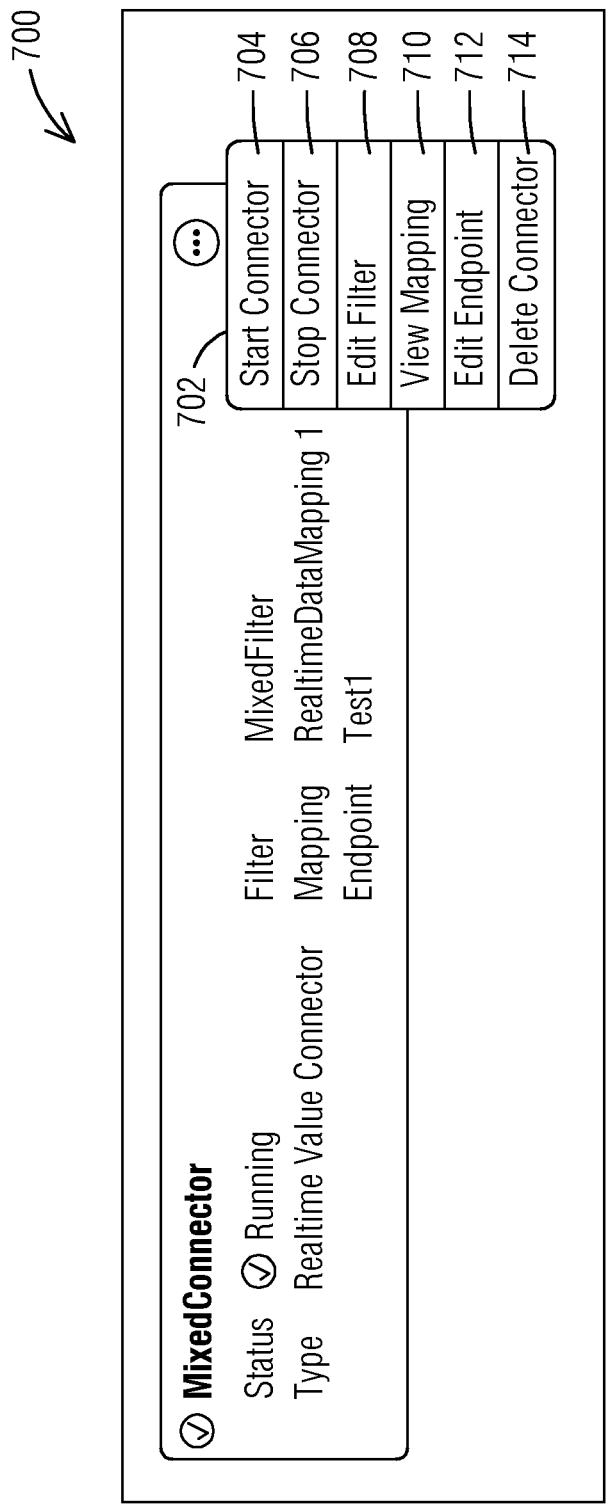

Referring to FIG. 7, The SBDC 112 may start, stop, modify, and delete connectors, as represented by the status window 700. For example, each defined connector may be represented as a tile on the connectors page. A connector interaction window 702 of a connector tile may provide connector features, such as a start connector feature 704, a stop connector feature 706, an edit filter feature 708, a view mapping feature 710, an edit endpoint feature 712, and a delete connector feature 714.

The start connector feature 704 may start a connector. When a COV connector starts, it will subscribe to COV changes of the datapoints in its configured filter and send the received data to the configured endpoint. If a connector starts it will also consume one connector license from the SBDC license pool.

The stop connector 706 feature may stop a connector. When a COV connector stops, it will unsubscribe from COV changes and stop sending data to the configured endpoint. If a connector stops it will return one connector license to the SBDC license pool.

The edit filter feature 708 may allow modification of the filter.

The view mapping feature 710 may display the mapping from the received data to the tags of the send data.

The edit endpoint feature 712 may allow the modification of the endpoint.

The delete connector feature 714 may utilized to delete a connector. When a COV connector is deleted, it will unsubscribe from COV changes, stop sending data to the configured endpoint, and delete all buffered data that was not sent to the endpoint. If a connector gets deleted, it will return one connector license to the SBDC license pool.

Figure 8A:
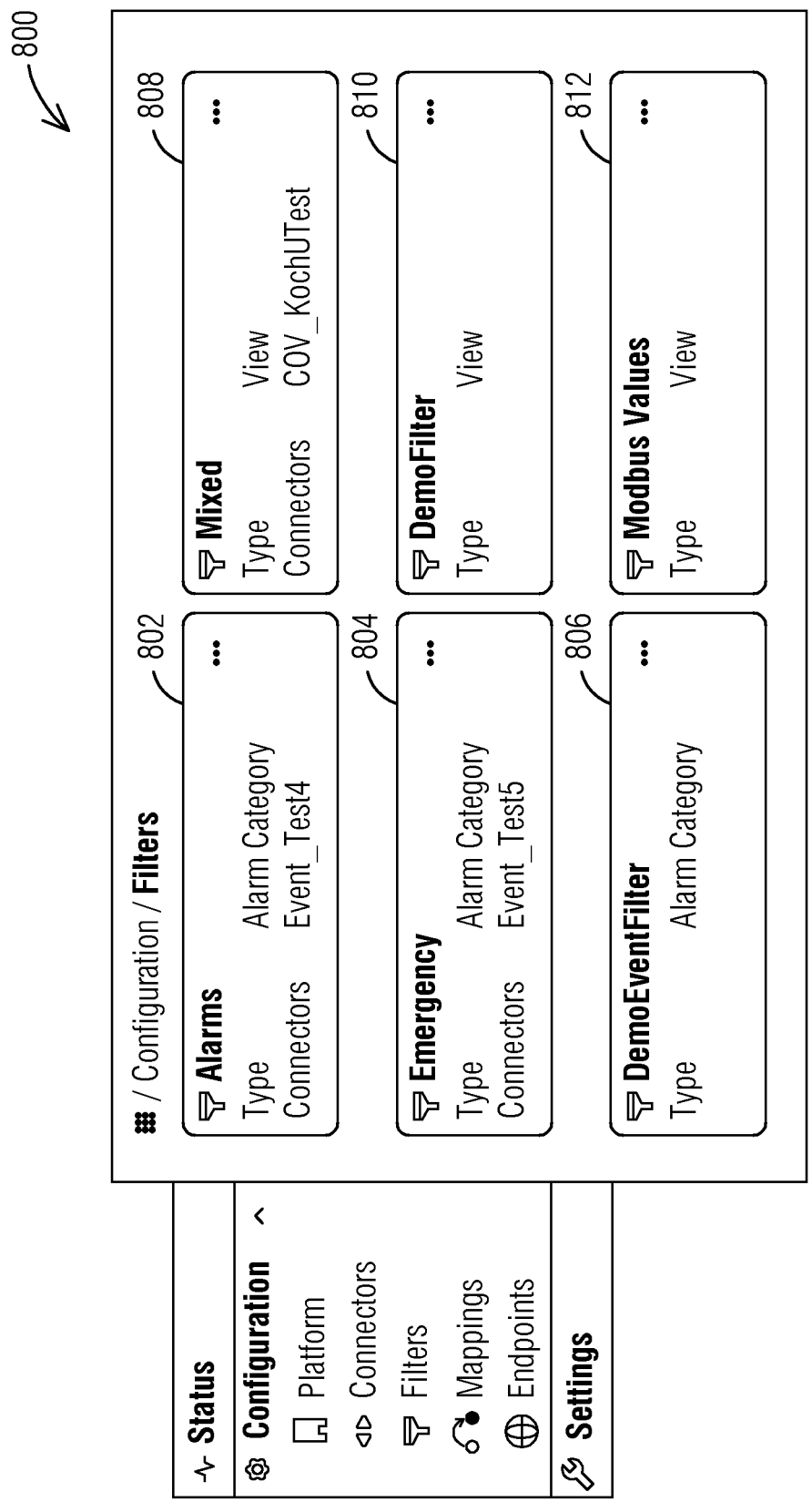
Figure 8B:
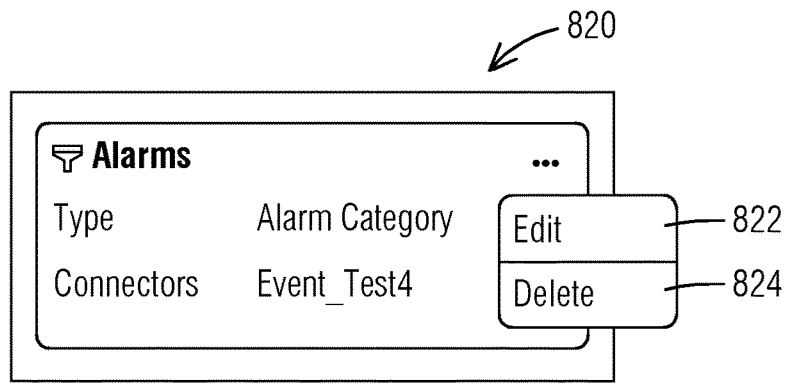
Figure 8C:
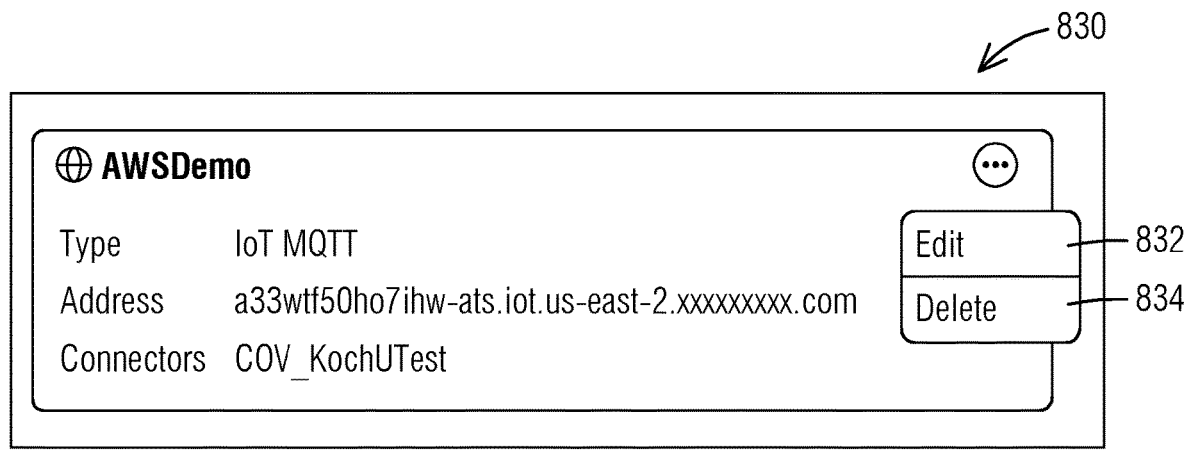

Referring to FIGS. 8A, 8B, and 8C, filters, mappings, and endpoints may be edited. As shown by the filters configuration page 800 in FIG. 8A, a given connector may be associated with one of the filters. Examples of the filter include, but are not limited to, an alarms filter 802, 804, 806 or a data filter 808, 810, 812. Filters may also be edited directly on a filters configuration page, as well as deletion of unused filters. FIG. 8B shows a representation for editing 822 and/or deleting 824 filters. Similarly, FIG. 8c shows a representation of an endpoint configuration page for editing 832 and/or deleting 834 endpoints.

Figure 9:
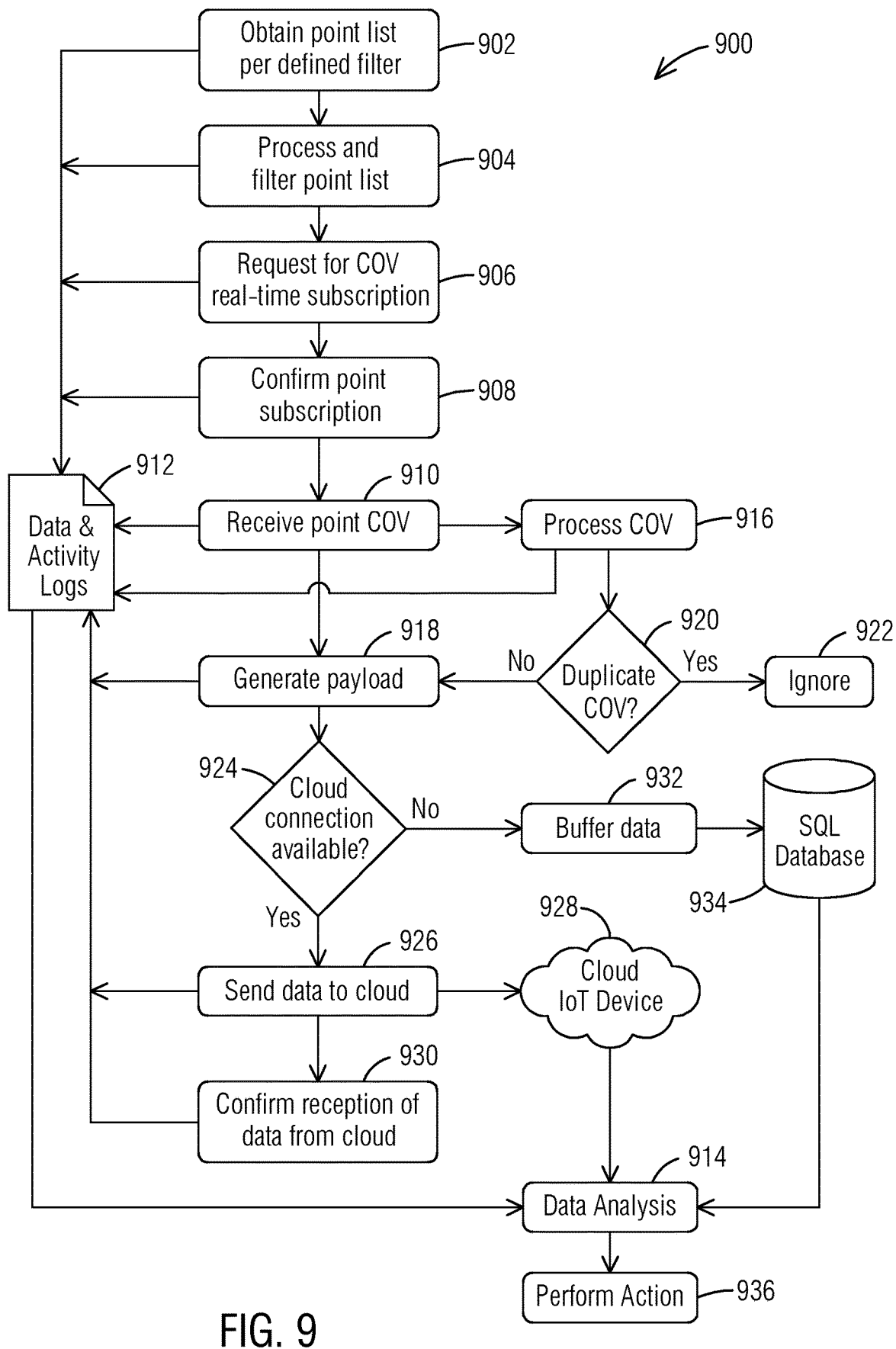
FIG. 9 is a flow diagram representing a management operation of the SBDC in an example implementation.

Referring to FIG. 9, there is shown a flow diagram representing a management operation 900 of the SBDC 112 of a building management system 100 in an example implementation. The SBDC 112 is configured (902, 904, 906, 908) before receiving (910) change of value data from a local data device 110. The SBDC 112 is configured by obtaining (902) a point list from the local data device 110, processing (904) the point list based on a defined filter of the SBDC, and confirming (908) a change of value subscription associated with the remote cloud device 114. The point list may be based on a customer-defined filter or other data associated with the source device (i.e., local data device 110). The SBDC 112 processes (904) the point list based on the source configuration, filter configuration, mapping configuration, and/or endpoint configuration of the connector. For example, when processing (904) the point list, the SBDC 112 may filter the point list based on the capabilities of the remote cloud device 114 as well as other processing tasks. For some embodiments, a subscription may be arranged between the local data device 110 and the remote cloud device 114. For example, the SBDC 112 may request (906) a COV real-time subscription, and the point subscription may be confirmed (908). SBDC 112 generates the subscription from the building management system 100 in which only subscribed points have their data sent to the cloud 114 by SBDC. The subscription is associated with real-time notifications of change of values. When a subscribed point of the SBDC 112 has a change in a value, notification about the new value is received in real-time.

The SBDC 112 includes data and activity logs 912 to track the data and activity of the management operation 900. Data and activity of the SBDC 112 may be reported to the data and activity logs 912 in response to obtaining (902) the point list from the local data device 110, processing (904) the point list based on a defined filter of the SBDC, requesting (906) the change of value subscription, and/or confirming (908) the change of value subscription. Subsequently, the processor 206 of the SBDC 112 or the remote cloud device 114 may determine results of data analytics 914 based on data received by the logs 912, such as the change of value data.

The SBDC 112 processes (916) the change of value data to generate a payload (918) of the processed change of value data, i.e., processed data. The SBDC 112 processes (916) the change of value data based on the source configuration, filter configuration, mapping configuration, and/or endpoint configuration of the connector. For example, the processor 206 of the SBDC 112 may generate the processed data based on the change of value data and mapping data correlating the local data device 110 to the remote cloud device 114. For some embodiments, the processor 206 may also detect (920) duplicates of the processed data and generate (918) the payload based on the processed data without the duplicates, i.e., ignoring (922) the duplicate data. Data and activity of the SBDC 112 may be reported to the data and activity logs 912 in response to receiving (910) the change of value data, processing (916) the change of value data, and/or generating (918) the payload. The processor 206 of the SBDC 112 or the remote cloud device 114 may determine subsequently results of data analytics 914 based on data received by the logs 912, including one or more of the change of value data and the payload.

For some embodiments, the SBDC 112 may determine (924) whether the cloud connection is available in response to generating (918) the payload or before attempting (926) to transmit the payload of processed data to the remote cloud device 114, 928. For some embodiments, the processor 206 of the SBDC 112 may await confirmation (930) of reception of the payload from the remote cloud device 114, 928 in response to attempting (926) to transmit the payload of processed data to the remote cloud device 114, 928. For example, the input component 218 of the SBDC 112 may receive an acknowledgement from the remote cloud device 114 in response to transmitting (926) the payload or determine that no errors or other indicators have been detected in response to transmitting (926) the payload. Data and activity of the SBDC 112 may be reported to the data and activity logs 912 in response to transmitting (926) the payload and/or confirming (930) reception of the payload. The processor 206 of the SBDC 112 or the remote cloud device 114 may determine subsequently results of data analytics 914 based on data received by the logs 912, including one or more of the transmission data and/or confirmation data.

The processor 206 of the SBDC 112 may perform a buffer function subsequent to determining (924) whether the cloud connection is available. In particular, the processor 206 may generate (932) buffer data in response to determining (924) that the remote cloud device 114 is not ready to receive the processed data or determining (924) that the processed data has not been transmitted properly to the remote cloud device. The buffer data may be stored at a buffer database 934 for subsequent analysis (914) by the data analytics.

As stated above, the processor 206 of the SBDC 112 or the remote cloud device 114 may determine subsequently results of data analytics 914 based on data received by the logs 912. Data logs include the point list and the change of values of the points processed by SBDC 112 during different processing stages. Activity logs include system outputs generated by SBDC 112 during these stages for reference/diagnostic purposes. The SBDC 112 logs messages related to its operation in the log files. The SBDC 112 generates data files that include data relating to the points and values. Examples of information of the messages and/or data files by the data analytics 914 include, but are not limited to, error data, warning data, debug data, and other information. For example, the data may include the change of value data, the processed data, and the buffer data.

The data analytics include checking for data loss, processing speed, and data throughput. In particular, the data analytics 914 include data integrity portion, data transmission performance portion, and a data error portion, in which further details regarding the SBDC buffering are provided below. The data and activity logs 912, the buffer database 934, and the data stored in the cloud are generated and updated continuously or periodically when the connectors are active. The remote cloud device 114 performs (936) one or more actions based on the results of the data analytics 914.

SBDC Buffering

Figure 10:
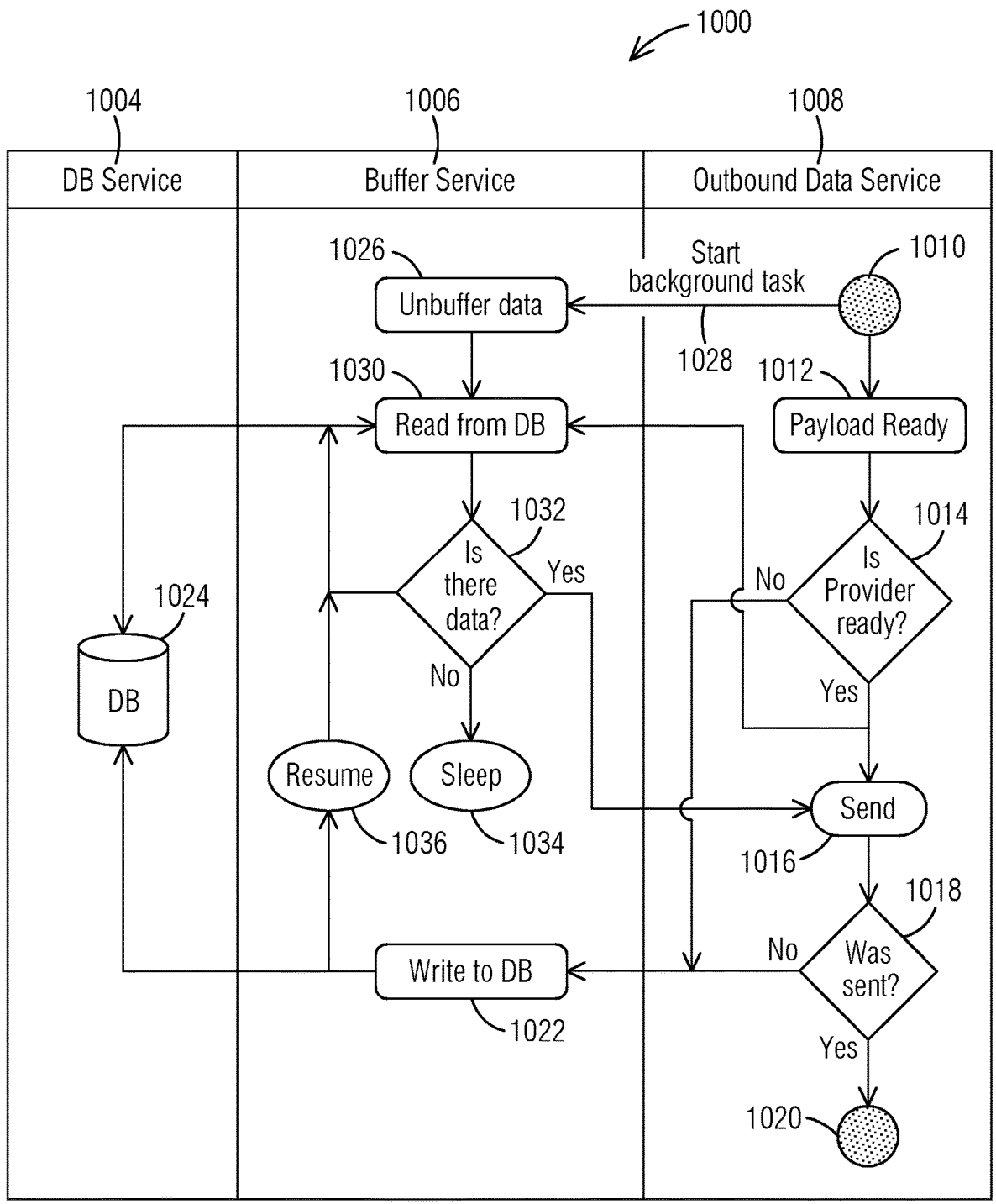
FIG. 10 is a flow diagram a buffering operation of the SBDC in an example implementation.

Referring to FIG. 10, there is shown a buffer system operation 1000 of the SBDC 112 of a building management system 100 for real-time buffering of building management data, such as COV data. The SBDC 112 buffers data, instead of transmitting it to the cloud, if cloud connection to the endpoint is temporarily not available. The buffered data is stored in a database for high data volume, for low latency, and for security.

The buffer system operation 1000 represents the operations of three services, namely a database service 1004, a buffer service 1006, and an outbound data service 1008. The buffer system operation 1000 starts (1010) with the outbound data service 1008 and identifies (1012) that a payload of data is ready for transfer. In particular, the outbound data service 1008 identifies (1012) a payload of a local data device for transmission to a remote cloud device. The outbound data service 1008 then determines (1014) whether a cloud provider, such as a remote cloud device, is ready to receive the payload. An example of the cloud provider is a remote cloud device 114. In response to the outbound data service 1008 determining (1014) that the cloud provider is ready to receive the payload, the outbound data service transmits (1016) the payload to the cloud provider. In response to transmitting (1016) the payload to the cloud provider, the outbound data service 1008 determines (1018) whether the payload has been transmitted properly to the cloud provider. For example, the outbound data service 1008 may receive an acknowledgement from the cloud provider in response to transmitting the payload or determine that no errors or other indicators have been detected in response to transmitting the payload. Thereafter, the buffer system operation 1000 may return to monitoring available payloads (1010) or terminate operation (1020).

If the outbound data service 1008 determining (1014) that the cloud provider is not ready to receive a payload, then the outbound data service may notify the buffer service 1006 that the payload may need to be buffered. Likewise, if the outbound data service 1008 determining (1018) that a payload has not been transmitted properly (1018) to the cloud service, then the outbound data service 1008 may notify the buffer service 1006 that the payload may need to be buffered. As a result, the buffer service 1006 buffers (1022) the payload to a buffer database 1024 of the buffer service 1004 in response to determining (1014) that the remote cloud device is not ready to receive the payload or determining (1018) that the payload has not been transmitted properly to the remote cloud device. For example, the buffer service 1006 may buffer the payload by writing, or instructing the database service 1004 to write, data of the payload to the buffer database 1024.

The buffer service 1006 may process any buffered data in response to a message or action of the outbound data service 1008. In particular, the buffer service 1006 may unbuffer a previously buffered payload in response to determining (1014) that the remote cloud device is ready to receive the payload or an unbuffer action (1026) by a background task (1028) of the outbound data service 1008. For example, the buffer service 1006 may unbuffer the previously buffered payload by reading (1030) the data of the payload from the buffering database 1024 for a transmission (1016) of the payload to the remote cloud device.

The buffer service 1006 may provide buffered data stored at the buffer database 1024 by the database service 1004 to the outbound data service 1008 when the cloud connection to the endpoint become available. The outbound data service 1008 may then transmit (1016) the received buffered data to the cloud provider. The outbound data service 1008 may continue to receive buffered data from the buffer service 1006 until there is no more data that may be processed (1032) or the cloud connection to the endpoint becomes temporarily unavailable again. To determine whether data may be processed (1032), the buffer service 1006 determines whether a first buffer data exists in the buffer database 1024. The buffer server 1006 activates (1034) a sleep state in response to determining that the first buffer data does not exist in the buffer 1024 database. The buffer service deactivating (1036) the sleep state in response to determining that a second buffer data is added to the buffer database 1024. In this manner, the buffer service may deactivate (1036) the sleep state in response to the outbound data service 1008 determining (1014) that the remote cloud device is not ready to receive the payload or determining (1018) that the payload has not been transmitted properly to the remote cloud device.

SBDC Data Analyzer

A data analyzer of building management system is a tool to analyze the data processing and transmission of the SBDC 112. The tool examines data created by the SBDC 112 locally, such as data and activity logs and SQL database. The tool also examines data sent to the cloud service by the SBDC 112 for one or more functions. For one example, the tool may check whether the SBDC 112 properly processes and sends all the data. The tool may also identify and report missing data and their related activities, by sorting, linking, and comparing properties and values of each point at different processing stages and querying them in the activity log. For another example, the tool may evaluate the SBDC's performance in data processing and sending speed by using timestamps associated with each point's properties and values for each process. For yet another example, the tool may calculate the SBDC's data sending throughput to enable comparison with cloud service data transmission limit and, therefore, avoid potential throttling. For still another example, the tool may identify and report any other potential issues in SBDC's data processing. For other embodiments, the tool may perform a combination of the above functions. The main analysis results, including a couple of statistics and metrics for each data process stage of all the runs, may include two summary data: one including information about data transmission loss and another including information about time duration and data transmission speed and latency.

The data analyzer may analyze the data integrity performance of the SBDC 112. Analysis of data integrity in each stage uses one or a combination of attributes to identify points and COVs in each data file. Duplications may be reported in a corresponding file and ignored in related analyses. The same or a different set of attributes may be used in the mapping of points and COVs among different files.

One or more of the following statistics and metrics may be included in a data integrity portion of the file:

Count of points requested for subscription: Number of points SBDC requested to subscribe from building management system.

Count of points missing in subscription request: Number of points requested but went missing after filtering.

Count of points missing in subscription callback: Number of points requested for subscription but were missing in subscription.

Count of points missing in COV notifications: Number of subscribed points whose COV notification were not received by SBDC.

Count of COVs in payload: Number of COVs in source payload.

Count of COVs missing in endpoint sending: Number of COVs in source payload but were neither sent to the cloud service nor buffered in local database.

Count of COVs in endpoint sending: Number of COVs being sent to the cloud service.

Count of COVs in endpoint sent: Number of COVs that have been sent to the cloud service.

Count of COVs missing in cloud endpoint: Number of COVs sent to the cloud service but not received.

Count of COVs in buffered data: Number of COVs buffered in local database.

Count of COVs missing in SQL database: Number of COVs buffered in local database but were actually missing.

Count of duplications in various data files: Number of duplications in each data log file.

One or more of the following statistics and metrics may be included in a data transmission performance portion of the file:

Startup time: Timestamp of the "Startup complete" message in the activity log file.

Startup duration [ms]: Time duration as reported in the "Startup complete" message in the activity log file.

Connector start time: Timestamp of the "Startup" message in the log file.

Connector stop time: Timestamp of the "Calling to dispose resources in CovSubscriptionService" message in the log file.

Time elapsed within postprocessed filter points [ms]: Time duration of SBDC processing filtered points.

Time elapsed within status callback [ms]: Time duration of SBDC confirming point subscription.

Time elapsed within source payload [ms]: Time duration of SBDC receiving COVs and generating payloads.

Time elapsed within endpoint sending [ms]: Time duration of SBDC sending payloads to the cloud service.

Time elapsed within cloud received [ms]: Time duration of the cloud service receiving SBDC payloads.

Average COV message size [KB]: Average size of COV message sent to the cloud service.

Total COV message size [KB]: Total size of COV messages sent to the cloud service.

Data transmission speed [COV/min]: Average speed of SBDC sending COV messages in the unit of COVs per minute.

Data transmission speed [KB/min]: Average speed of SBDC sending COV messages in the unit of KB per minute.

Time elapsed subscription [ms] (between request and callback): The minimum, maximum, average, and median of time durations of all the points from subscription request to subscription confirmation.

Time elapsed receiving COV [ms] (between sub status callback and COV): The minimum, maximum, average, and median of time durations of all the points from subscription confirmation to reception of first COV notification.

Time elapsed processing [ms] (between receiving COV and sending to endpoint): The minimum, maximum, average, and median of time durations of all the COVs from being included in payload to being sent to the cloud service.

Time elapsed endpoint [ms] (between sending to endpoint and receiving response): The minimum, maximum, average, and median of time durations of all the COVs from being sent to the cloud service to being received by the cloud service.

One or more of the following statistics and metrics may be included in a data error portion of the file:

Endpoint Data: Main table of endpoint data for each run, with all the important information regarding point identity, values, and process time.

Missing Data: List of missing data for each run, containing the following for all the processing stages: MissingData_Subscription, MissingData_Callback, MissingData_Payload, MissingData_EndpointSent, MissingData_Cloud, and MissingData_Buffering.

DuplicatedData: List of points and COVs that are identified as duplicated by one or a combination of attributes such as Name, UID, SubscriptionKey, Timestamp, and/or Value.

MismatchData: List of points and COVs that are missing in the data file of a processing stage but present in the data file of the next stage, suggesting probably a connector logging issue.

ErrorData: List of COVs that have specific error codes and empty Value and DataType.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A smart building data connector of a building management system comprising:
   one or more processors; and
   at least one memory component storing instructions that, when executed by the one or more processors, cause the system to:
   identify a payload of a local data device for transmission to a remote cloud device;
   determine whether the remote cloud device is ready to receive the payload;

transmit the payload to the remote cloud device via a communication component in response to determining that the remote cloud device is ready to receive the payload;

determine whether the payload has been transmitted properly to the remote cloud device in response to transmitting the payload to the remote cloud device;

buffer the payload in response to determining that the remote cloud device is not ready to receive the payload or the payload has not been transmitted properly to the remote cloud device;

determine whether a first buffer data exists in a buffer database;

activate a sleep state of the buffer service in response to determining that the first buffer data does not exist in the buffer database; and deactivate the sleep state of the buffer service in response to determining that the remote cloud device is not ready to receive the payload or the payload has not been transmitted properly to the remote cloud device.

2. The smart building data connector as described in claim 1, wherein the buffer service buffers the payload by writing data of the payload to a buffer database.

3. The smart building data connector as described in claim 1, wherein the buffer service unbuffers a previously buffered payload in response to the outbound data service determining that the remote cloud device is ready to receive the payload or an unbuffer action by a background task.

4. The smart building data connector as described in claim 3, wherein the buffer service unbuffers the previously buffered payload by reading the data of the payload from the buffer database for a transmission of the payload to the remote cloud device.

5. The smart building data connector as described in claim 1, wherein an outbound data service of the processor transmits the payload to the remote cloud device based on a mapping of the smart building data connector from a source point of the building management system to a destination point of the building management system.

6. The smart building data connector as described in claim 1, wherein an outbound data service of the processor receives change of value data from the local data device and generates the payload based on the change of value data.

7. A method of a smart building data connector of a building management system comprising:

identifying a payload of a local data device for transmission to a remote cloud device, wherein the payload is associated with building management of a building and the local data device monitors or controls a function of the building;

determining whether the remote cloud device is ready to receive the payload;

transmitting the payload to the remote cloud device in response to determining that the remote cloud device is ready to receive the payload;

determining whether the payload has been transmitted properly to the remote cloud device in response to transmitting the payload to the remote cloud device;

buffering the payload in response to determining that the remote cloud device is not ready to receive the payload or the payload has not been transmitted properly to the remote cloud device;

determining whether a first buffer data exists in a buffer database;

activating a sleep state of a buffer service in response to determining that the first buffer data does not exist in the buffer database; and deactivating the sleep state of the buffer service in response to determining that in response to determining that the remote cloud device is not ready to receive the payload or the payload has not been transmitted properly to the remote cloud device.

8. The method as described in claim 7, wherein buffering the payload include writing data of the payload to a buffer database.

9. The method as described in claim 7, further comprising unbuffering a previously buffered payload in response to determining that the remote cloud device is ready to receive the payload or an unbuffer action by a background task.

10. The method as described in claim 9, wherein unbuffering the previously buffered payload includes reading the data of the payload from the buffer database for a transmission of the payload to the remote cloud device.

11. The method as described in claim 7, wherein transmitting the payload to the remote cloud device includes transmitting the payload of the remote cloud device based on a mapping of the smart building data connector from a source point of the building management system to a destination point of the building management system.

12. The method as described in claim 7, wherein identifying the payload of the local data device includes receiving change of value data from the local data device and generating the payload based on the change of value data.

* * * * *